(12) United States Patent
Albano et al.

(10) Patent No.: US 12,646,721 B2
(45) Date of Patent: Jun. 2, 2026

(54) MULTIFUNCTIONAL POLYNORBORNENE BINDER SYSTEM

(71) Applicant: NantG Power, LLC, El Segundo, CA (US)

(72) Inventors: Fabio Albano, El Segundo, CA (US); Nicolas Bednar, El Segundo, CA (US); Taylor Juran, El Segundo, CA (US); Patrick Soon-Shiong, El Segundo, CA (US); John Chmiola, El Segundo, CA (US)

(73) Assignee: NantG Power LLC., El Segundo, CA (US)

( * ) Notice: Subject to any disclaimer, the term of this patent is extended or adjusted under 35 U.S.C. 154(b) by 0 days.

(21) Appl. No.: 18/910,698

(22) Filed: Oct. 9, 2024

(65) Prior Publication Data

US 2025/0118756 A1 Apr. 10, 2025

Related U.S. Application Data

(60) Provisional application No. 63/588,944, filed on Oct. 9, 2023.

(51) Int. Cl.
H01M 4/66 (2006.01)
H01M 4/58 (2010.01)
(Continued)

(52) U.S. Cl.
CPC ......... H01M 4/622 (2013.01); H01M 4/5825 (2013.01); H01M 4/625 (2013.01); (Continued)

(58) Field of Classification Search
None
See application file for complete search history.

(56) References Cited

U.S. PATENT DOCUMENTS

2011/0177398 A1* 7/2011 Affinito ................. H01M 4/134
429/231.95
2011/0287305 A1* 11/2011 Scordilis-Kelley ... H01M 4/136
429/207
(Continued)

FOREIGN PATENT DOCUMENTS

JP 2021/089888 * 6/2021 ............. C01B 25/45

OTHER PUBLICATIONS

English translation of JP 2021/089888 (Year: 2021).*

*Primary Examiner* — Yoshitoshi Takeuchi
(74) *Attorney, Agent, or Firm* — Finnegan, Henderson, Farabow, Garrett & Dunner LLP.

(57) ABSTRACT

A cathode electrode assembly is disclosed, the cathode electrode assembly comprising an active material, a current collector, a conductive additive substance, and a polynorbornene-based (PNB) polymer binder configured to bind the active material and the conductive additive substance and maintain electrical contact between the active material and the conductive additive substance with the current collector. An alternative cathode electrode assembly comprising active material, a current collector, a conductive additive substance, a PNB polymer binder, and at least one polyacrylic acid (PAA) side chain configured to interface with the PNB polymer binder is also disclosed. A functional group is further disclosed, the functional group being configured to interface with a binder in a cathode electrode assembly of an electric battery system, the functional group comprising at least one PAA side chain.

15 Claims, 7 Drawing Sheets

(51) Int. Cl.

| | |
|---|---|
| *H01M 4/62* | (2006.01) |
| *H01M 4/64* | (2006.01) |
| *H01M 10/052* | (2010.01) |
| *H01M 4/02* | (2006.01) |

(52) U.S. Cl.

CPC ......... *H01M 4/661* (2013.01); *H01M 10/052* (2013.01); *H01M 2004/021* (2013.01); *H01M 2004/028* (2013.01)

(56) References Cited

U.S. PATENT DOCUMENTS

| | | | | |
|---|---|---|---|---|
| 2012/0048729 | A1* | 3/2012 | Mikhaylik | ............. H01M 4/13 |
| | | | | 429/246 |
| 2013/0059193 | A1* | 3/2013 | Scordilis-Kelley | ......................... |
| | | | | H01M 10/4235 |
| | | | | 429/188 |
| 2014/0170478 | A1* | 6/2014 | Liao | ................. H01M 10/0567 |
| | | | | 429/207 |
| 2015/0318555 | A1* | 11/2015 | Oku | ..................... B32B 27/365 |
| | | | | 429/245 |
| 2018/0151884 | A1* | 5/2018 | Yushin | ................. H01M 4/134 |
| 2019/0341616 | A1* | 11/2019 | Yoon | .................... H01M 4/622 |
| 2020/0067128 | A1* | 2/2020 | Chmiola | ................ H01M 4/36 |
| 2020/0373552 | A1* | 11/2020 | Albano | .............. H01M 4/0419 |
| 2021/0313617 | A1* | 10/2021 | Yushin | ................. H01M 4/366 |
| 2022/0013786 | A1* | 1/2022 | Daigle | ................. C08F 132/08 |
| 2023/0015653 | A1* | 1/2023 | Yushin | ............. H01M 10/0525 |
| 2023/0069652 | A1* | 3/2023 | Kim | ...................... H01M 4/625 |
| 2024/0266511 | A1* | 8/2024 | Fleutot | ............. H01M 10/0565 |
| 2024/0372070 | A1* | 11/2024 | Asai | ...................... H01M 4/622 |
| 2024/0372098 | A1* | 11/2024 | Fleutot | ............... H01M 10/054 |
| 2024/0429396 | A1* | 12/2024 | Asai | ...................... H01M 4/505 |

* cited by examiner

100
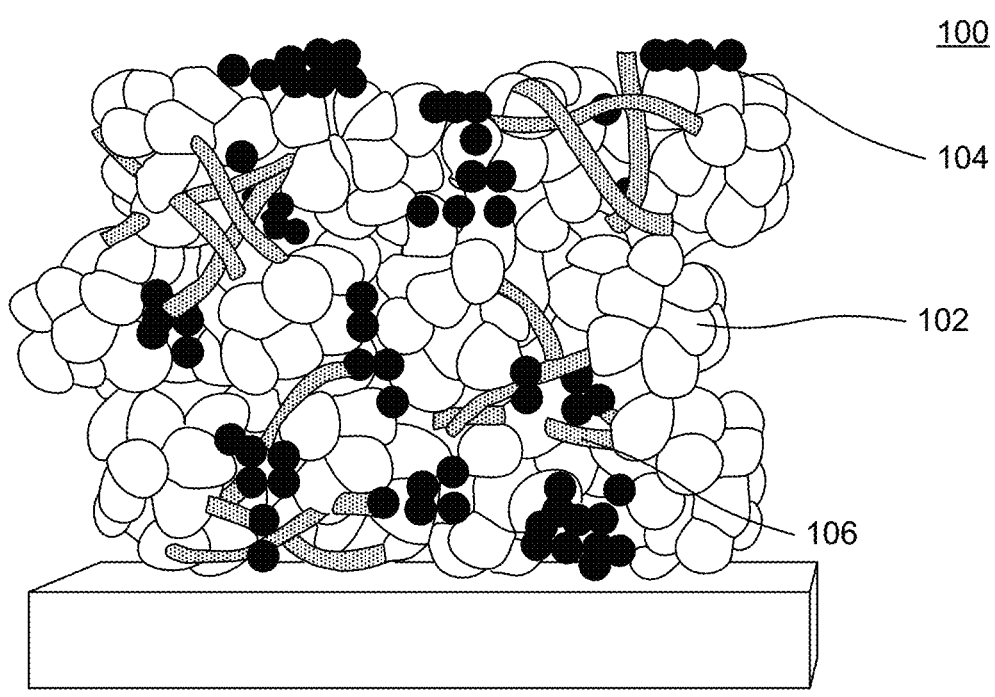
104
102
106
FIG. 1A – PRIOR ART
108
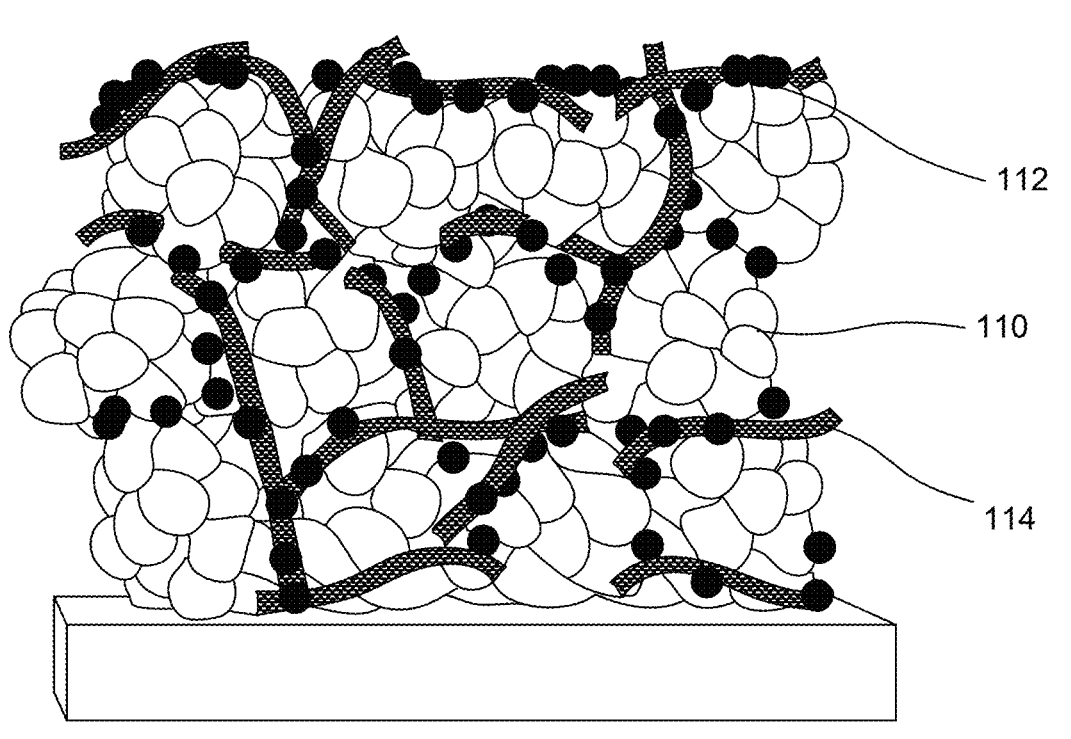
112
110
114
FIG. 1B – PRIOR ART 200
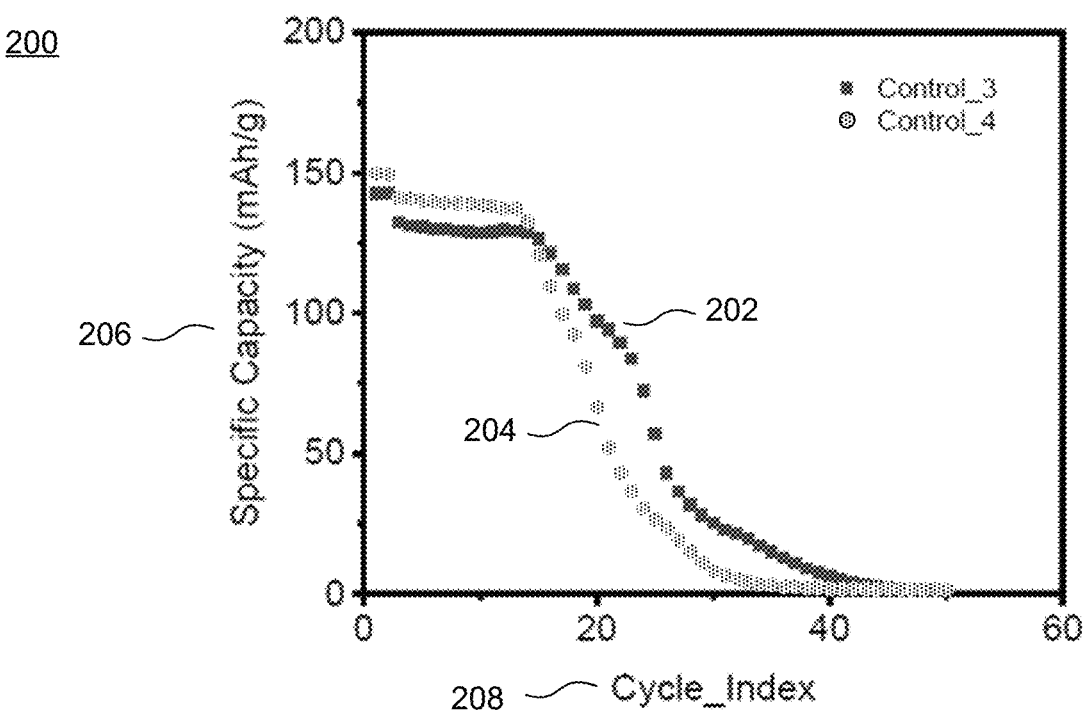
206
202
204
208 — Cycle_Index
FIG. 2A – PRIOR ART
210
216
212
218
218
214
216
Capacity (mAh/g)
FIG. 2B – PRIOR ART

300

302

304

500

Figure 6:
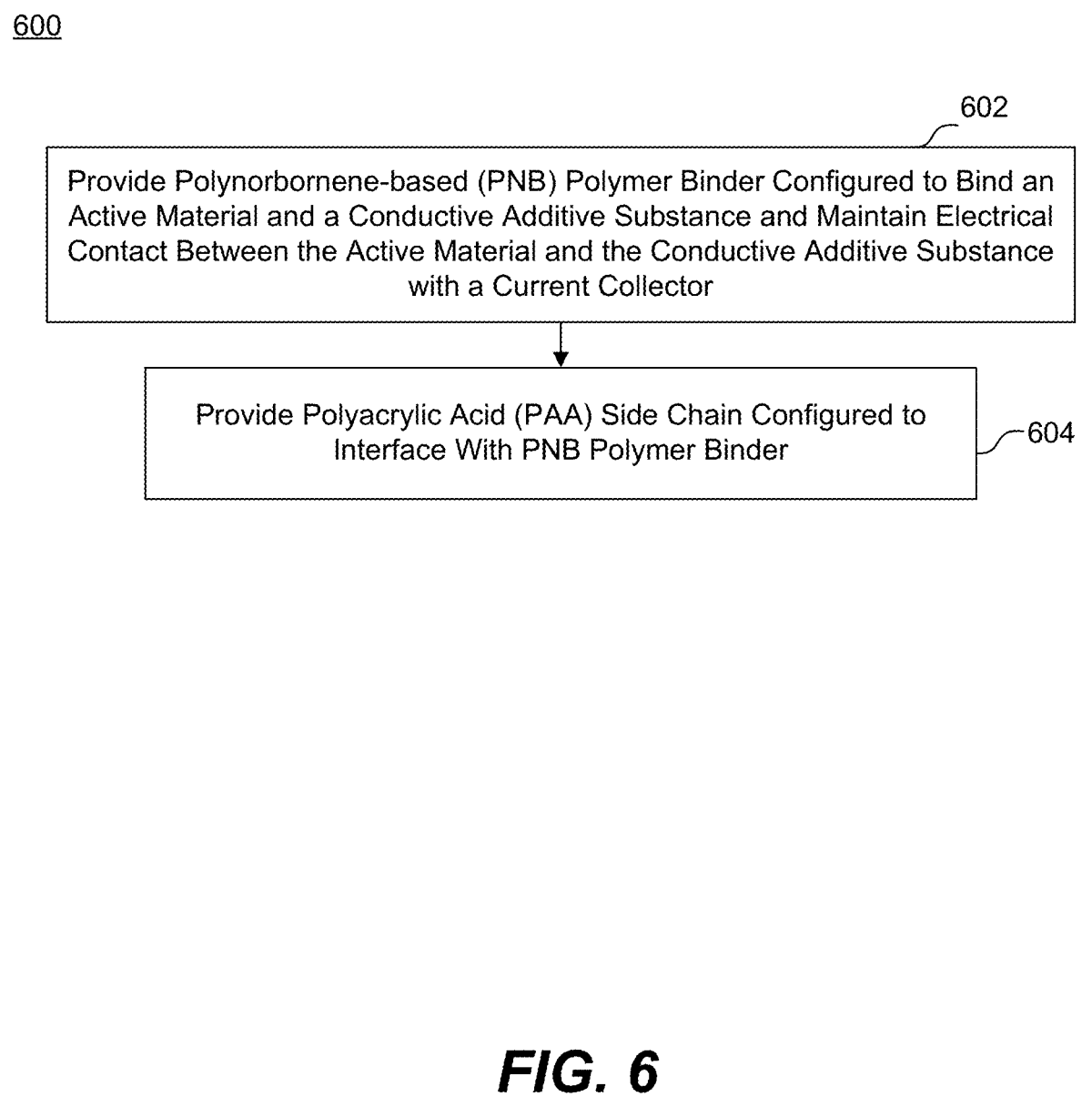

600

602

Provide Polynorbornene-based (PNB) Polymer Binder Configured to Bind an Active Material and a Conductive Additive Substance and Maintain Electrical Contact Between the Active Material and the Conductive Additive Substance with a Current Collector Provide Polyacrylic Acid (PAA) Side Chain Configured to Interface With PNB Polymer Binder

MULTIFUNCTIONAL POLYNORBORNENE BINDER SYSTEM

CROSS-REFERENCE TO RELATED PATENT APPLICATION

This application claims the benefit of U.S. Provisional Application No. 63/588,944, filed Oct. 9, 2023, entitled "A Multifunctional Polynorbonene Binding System Enabling Next-Generation Lithium-Ion Batteries," the entirety of which is incorporated by reference herein.

FIELD

Apparatuses and methods consistent with the present disclosure relate generally to binders used in batteries, more specifically, polynorbonene (PNB) polymer binders and polyacrylic acid (PAA) side chains in cathodes in lithium-ion batteries.

BACKGROUND

PVDF (Polyvinylidene fluoride) is currently the most widely used binder for lithium-ion battery cathode manufacturing due to its strong particle-particle cohesion and particle adhesion to the current collector. LFP (lithium iron phosphate) and NMC (nickel manganese cobalt) are currently the most widely used cathode active materials because of their high energy and power density.

Olivine cathode materials (e.g., lithium manganese iron phosphate ("LMFP")) have attracted interest due to their cost-effective manufacturing processes and performance comparable to known NMC lithium-ion materials. Olivine-based cathode active materials are relatively less expensive, and do not rely on rare earth metals or elements such as cobalt, which are relatively scarce in North America.

FIG. 1A, representing prior art, is a diagram of a cathode electrode assembly 100 available in the prior art, wherein polyvinylidene fluoride (PVDF) is used as binder. Cathode electrode assembly 100 contains active material 102. In this example, active material 102 is NMC, which is not subject to the same manganese dissolution issues that LMFP cathodes are. However, NMC cathodes contain cobalt, which, as mentioned, is not abundant in North America. There is a need for effective cathodes, such as an LMFP cathode, which may be manufactured using domestically available materials.

Cathode electrode assembly 100 contains carbon black 104. Carbon black is generally used as a conductive additive to improve the electrical conductivity of the electrode. In this example, cathode 100 comprises PVDF binder 106.

Alternative binders, such as amphiphilic bottlebrush polymers (BBP) are used in the prior art but have not yet been applied to LMFP cathodes. For example, FIG. 1B, representing prior art, is a diagram of a cathode electrode assembly, wherein an amphiphilic bottlebrush polymer (BBP) is used as binder. BBP cathode electrode assembly 108 contains active material 110. In this example, active material 110 is also NMC, not LMFP. BBP cathode electrode assembly 108 contains carbon black 112. BBP cathode comprises BBP binder 114. BBP binders contain polyacrylic acid (PAA) side chains, which improve lithium-ion dispersion.

While PVDF has been a suitable binder for LFP and NMC cathodes, it is not as effective for LMFP cathodes, as illustrated in FIGS. 2A and 2B. Additionally, alternative binders for LMFP cathodes have traditionally seen little demand, given LFP and NMC's success. However, LMFP's relative ease of manufacturing and the availability of domestic materials have led to an increase in popularity, underscoring the need for alternative binders in LMFP cathodes.

Prior Art—Example 1

FIG. 2A, representing prior art, is a graph illustrating LMFP cycling data achieved using PVDF as a binder, referred to herein as PVDF cycling data 200. PVDF cycling data 200 was obtained using two LMFP cells, as illustrated in PVDF cycling curves 202, 204. PVDF cycling data 200 plots the observed specific capacity, shown on y-axis 206, over multiple cycles, shown on x-axis 208. Specific capacity is measured in milliamps per gram (mA/g). PVDF cycling curve 202 illustrates that specific capacity 206 gradually decreased from approximately 150 mA/g to 0 mA/g over approximately 40 cycles. PVDF cycling curve 204 illustrates that specific capacity 206 gradually decreased from approximately 150 mA/g to around 0 mA/g over approximately 35 cycles. As described elsewhere in this disclosure, cycling refers to a battery charging and discharging.

Prior Art—Example 2

FIG. 2B, representing prior art, is a graph illustrating galvanostatic charge and discharge curves observed in an LMFP cell using PVDF as a binder, referred to herein as PVDF charge/discharge data 210. PVDF charge/discharge data 210 illustrates charge and discharge data obtained over various stages of the LMFP cell's life. Here, PVDF charge curve 212 illustrates charge data obtained over the first charge/discharge cycle, measured in milliamp-hours per gram. The higher the observed charge/discharge capacity, the more efficient the battery cell.

In this example, PVDF charge curve 212 illustrates a charge capacity of approximately 160 mAh/g obtained during the LMFP cell's first charge/discharge cycle. PVDF discharge curve 214 represents discharge data obtained over the first charge/discharge cycle. In this example, PVDF discharge curve 214 illustrates a discharge capacity of approximately 145 mAh/g.

PVDF charge curve 216 illustrates charge data obtained during the LMFP cell's tenth charge/discharge cycle. In this example, PVDF charge curve 216 illustrates a charge capacity of slightly more than 125 mAh/g, which represents a capacity loss of approximately 35 mAh/g over ten charge/discharge cycles. PVDF discharge curve 218 represents discharge data obtained during the LMFP cell's tenth charge/discharge cycle. In this example, PVDF discharge curve 218 illustrates a discharge capacity of slightly more than 125 mAh/g, representing a discharge capacity loss of approximately 20 mAh/g over ten charge/discharge cycles.

During battery cycling, electrolyte decomposition generates acidic species inside the cell. Electrolyte decomposition refers to the breakdown of electrolyte in a battery cell and occurs over time based on various factors including, but not limited to, high temperature, high charging voltage, and age. Electrolyte decomposition leads to capacity loss.

In LMFP cathodes, electrolyte decomposition causes the dissolution of manganese ions into the electrolyte, i.e., unwanted manganese ions being released into the electrolyte. Manganese exists in different oxidation states during the cycling of a cell, and Mn2+ is soluble in electrolyte, causing dissolution from the cathode lattice. Manganese ion disproportionation causes disproportionate amounts of Mn2+ and Mn4+ ions to be formed.

In LMFP (lithium manganese iron phosphate) cathodes, manganese dissolution is the leading cause of capacity loss. Manganese dissolution can lead to irreversible structural transformation of the cathode, adversely affecting cathode stability. Manganese dissolution causes poor cycling performance and decreased cell life expectancy. As manganese leaves the LMFP chemical lattice, the cathode becomes less capable of releasing and storing electrons, thereby accelerating reduction of cell capacity.

Manganese dissolution is currently being addressed in several ways, including, without limitation, applying protective coatings to the surface of active material particles, surface doping, electrolyte enhancement, and optimizing cycling conditions. By applying protective coatings to the surface of particles, manganese dissolution can be mitigated by reducing the amount of contact between the manganese and the acids generated from electrolyte decomposition. Manganese ions nonetheless interact with the electrolyte, causing some manganese dissolution from disproportionation.

Other solutions available in the prior art include enhancing the purity of the electrolyte. Enhancing electrolyte purity avoids many of the unwanted reactions caused by electrolyte decomposition, obviating the need for particle coatings. Yet, manganese disproportionation remains an issue, thereby presenting the same shortcomings as particle coatings.

The present disclosure seeks to improve battery life and performance, and reduce capacity loss in LMFP cathodes, by utilizing alternative binders to PVDF, such as PNB. The present disclosure also seeks to prevent manganese dissolution in LMFP cathode assemblies by functionalizing PNB polymer binders with PAA side chains to create chelation sites and/or coordination complexes that help prevent manganese dissolution. The present disclosure improves energy density and battery performance for LMFP cathodes, and reduces dependence on materials, such as cobalt, that are rare in North America.

SUMMARY

Embodiments of the present disclosure comprise a cathode electrode assembly of an electric battery system, the cathode electrode assembly comprising an active material, a current collector, a conductive additive substance, and a polynorbornene-based (PNB) polymer binder configured to bind the active material and the conductive additive substance and maintain electrical contact between the active material and the conductive additive substance with the current collector.

Alternative embodiments provide a cathode electrode assembly of an electric battery system, the cathode electrode assembly comprising an active material, a current collector, a conductive additive substance, a polynorbornene-based (PNB) polymer binder configured to bind the active material and the conductive additive substance and maintain electrical contact between the active material and the conductive additive substance with the current collector, and at least one polyacrylic acid (PAA) side chain configured to interface with the PNB polymer binder.

Additional embodiments provide a functional group configured to interface with a binder in a cathode electrode assembly of an electric battery system, the functional group comprising at least one PAA side chain.

BRIEF DESCRIPTION OF FIGURES

FIG. 1A, representing prior art, is a diagram of a cathode electrode assembly available in the prior art, in which polyvinylidene fluoride (PVDF) is used as binder.

FIG. 1B, representing prior art, is a diagram of a cathode electrode assembly available in the prior art, in which an amphiphilic bottlebrush polymer (BBP) is used as binder.

FIG. 2A, representing prior art, is a graph illustrating LMFP cycling data achieved using PVDF as a binder.

FIG. 2B, representing prior art, is a graph illustrating galvanostatic charge and discharge curves in an LMFP cathode battery cell using PVDF as a binder.

FIG. 6 is a flow chart illustrating a method for forming a PNB-PAA binder, consistent with embodiments of the present disclosure.

DETAILED DESCRIPTION

Figure 3:
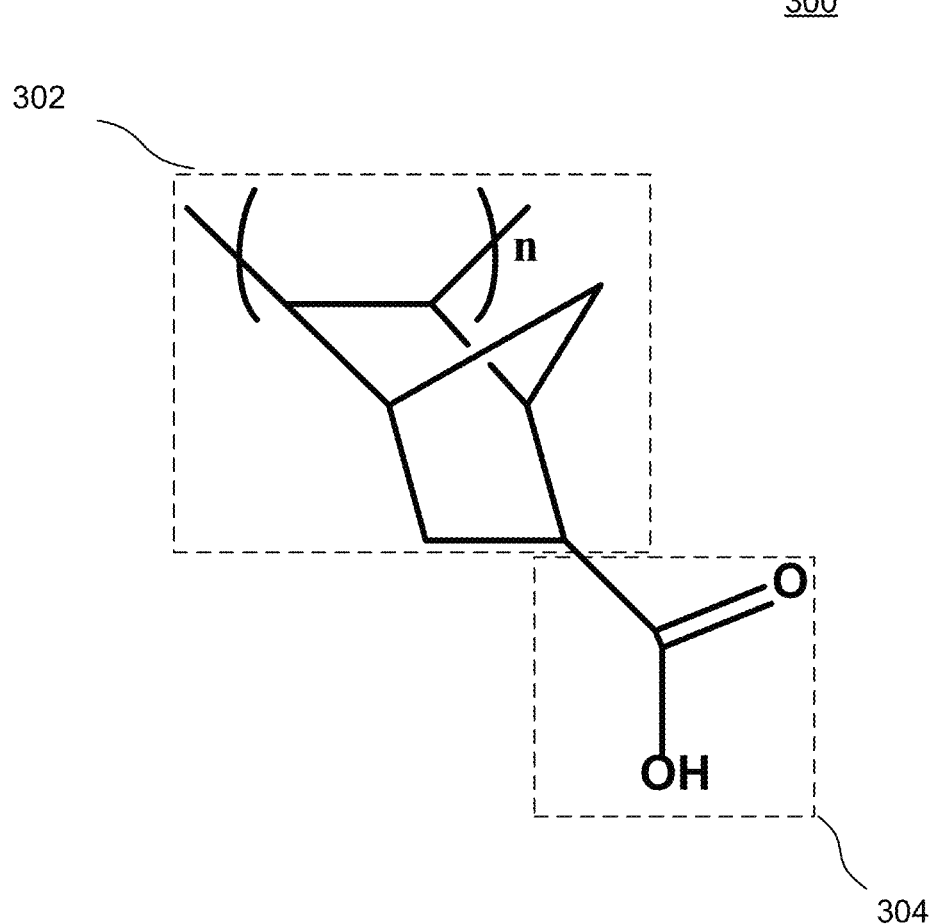
FIG. 3 is a schematic diagram illustrating a PNB polymer binder with a PAA side chain, consistent with embodiments of the present disclosure.

Reference will now be made in detail to exemplary embodiments, examples of which are illustrated in the accompanying drawings. The following description refers to the accompanying drawings, in which the same numbers in different drawings represent the same or similar elements, unless otherwise indicated. The implementations set forth in the following description of exemplary embodiments do not represent all possible implementations consistent with the present disclosure. Instead, they are merely exemplary systems, apparatuses, and methods relating to the present disclosure as recited in the appended claims.

Embodiments include, as described elsewhere in this disclosure, providing polynorbornene-based (PNB) polymer binder configured to bind active material and conductive additive substance and maintain electrical contact between active material and conductive additive substance with current collector. PNB is compatible with current commercial fabrication methods and has high mechanical strength. Using PNB polymer binders in LMFP cathodes improves energy density and battery performance and prolongs battery life when compared to PVDF binders available in the prior art, as illustrated by FIGS. 2A and 2B.

In some embodiments, PNB polymer binder is configured to withstand temperatures of at least 80° C. In a non-limiting example, PNB polymer binder may be configured to operate at 60° C., 70° C., 80° C. and/or 90° C. In some embodiments, PNB polymer binder is configured to operate at voltages of least 4.2 V. In a non-limiting example, PNB polymer binder may be configured to operate at 4 V, 4.2 V, 4.4 V, and/or 4.6 V.

Additional embodiments include, as described elsewhere in this disclosure, polyacrylic acid (PAA) side chain configured to interface with the PNB polymer binder. PAA provides strong adhesion of LMFP particles to the current collector, high dispersion ability, and a high percolation threshold leading to high uniformity and connectivity for strong ionic/electronic networks. Dispersion ability refers to the binder ability to disperse the active materials particles within a battery cell's electrode material to improve material utilization, and percolation threshold refers to the lowest concentration of a conductive additive at which an electrical pathway forms throughout an electrode material sample.

The PAA side chains are configured to chelate or create coordination complexes with manganese ions, which helps prevent manganese dissolution by confining manganese inside the LMFP chemical lattice, as described elsewhere in this disclosure. Chelating refers to forming multiple chemical bonds between organic molecules (here, PAA) and a transition metal ion (here, manganese) leading to sequestration of the metal. Creating the chelating sites helps prevent manganese dissolution because the manganese is chemically bonded to PAA. Reducing and/or preventing manganese dissolution reduces capacity loss, thereby improving capacity and life expectancy of battery cell, improving performance.

Embodiments comprise cathode electrode assembly of an electric battery system. Electric batteries typically comprise cathode and anode, where cathode refers to an electrode from which, on discharge, current leaves a battery and conventionally is designated as the positive electrode. Anode refers to an electrode, on discharge, through which current enters a battery, and is usually designated as the negative electrode.

Embodiments comprise active material. Active material refers to one or more chemical substances that facilitate electrochemical reactions between anode and cathode to store and release electrical energy. The active material may differ between different types of batteries. In some embodiments, active material comprises lithium manganese iron phosphate (LMFP). Consistent with disclosed embodiments, cathode may comprise, by weight, at least 80% active material. In a non-limiting example, cathode may comprise, by weight, 80% active material, 85% active material, 90% active material, or any percentage up to 98% active material.

In some embodiments, cathode comprises current collector. Current collector refers to a material that acts as a bridge to collect electrical current generated by the active materials within the cathode electrode and deliver it to the external circuit. In some embodiments, the current collector comprises metal foil. Metal foil may be copper, nickel, titanium, or any other suitable metal foil. In a preferred embodiment, current collector comprises aluminum.

In some embodiments, cathode comprises conductive additive substance. Conductive additive substances are used to facilitate electrochemical reaction in a battery, as it improves electrical conductivity in electrodes, i.e., anode and cathode. Carbon-based materials, such as graphene, are widely used because graphene offers high conductivity, mechanical strength, and flexibility. Consistent with disclosed embodiments, the conductive carbon substance may comprise carbon nano-tubes (CNTs), graphene, and/or carbon nanofibers. In some embodiments, cathode comprises, by weight, between 1% and 10% conductive additive substance. In a non-limiting example, cathode may comprise, by weight, 1%, 2%, 3%, 4%, 5%, or 10% conductive additive substance.

In some embodiments, the cathode electrode assembly comprises a polynorbornene-based (PNB) polymer binder configured to bind the active material and the conductive additive substance and maintain electrical contact between the active material and the conductive additive substance with the current collector. In some embodiments, cathode comprises, by weight, between 1% and 10% PNB polymer binder. In a non-limiting example, cathode may comprise, by weight, 1%, 2%, 3%, 4%, 5%, or 10% binder.

Consistent with disclosed embodiments, binder or binding material refers to material used to ensure contact between the active material and the conductive additives, and anchors those materials to the current collector. Commercially available binders may include polyethylene oxide, polyacrylonitrile, polyvinylidene fluoride (PVDF), carboxymethyl cellulose/styrene butadiene rubber (CMC-SBR), and/or polyvinylidene fluoride-hexafluoropropylene.

Alternative binders, such as PNB, for lithium-ion batteries are not widely used to do the successes of industry standard binders such as PVDF and CMC-SBR. However, with increased demands for cobalt free and iron-based cathode manufacturing, solutions for transition metal dissolution must be developed to allow LMFP to be used as a high-power and energy-dense alternative to NMC.

An LMFP cell's battery life and performance may be further improved by adding side chains to PNB polymer binder. The PNB polymer binder may function as the backbone. As used herein, backbone refers to the portion of a binder that is configured to accommodate another polymer, such as a polyacrylic acid side chain. A side chain refers to a smaller polymer configured to interface with a backbone polymer, here, PNB.

In an embodiment, the side chain may be hydrophilic polyacrylic acid (PAA), forming an amphiphilic PNB polymer binder. Amphiphilic binders exhibit both hydrophobic and hydrophobic properties, which allows for enhanced formation of electron/ion conduction networks, increased adhesion with current collectors, (i.e., aluminum current collectors), reduced electrolyte swelling, and active chelation of transmission metal ions, such as manganese ions, as described elsewhere in this disclosure. Electrolyte swelling refers to gases that are released in a battery cell over the lifetime of the battery, which can lead to catastrophic failure of the battery. Amphiphilic binders also allow for reduced tortuosity, which refers to a ratio that characterizes fluid diffusion and electrical conduction throughout cathode in battery cell. Reduced tortuosity ensures that materials, such as manganese ions, do not travel freely throughout the cathode, which improves battery performance.

In some embodiments, PNB may act as a conventional binder, providing particle-particle cohesion, while at least one functionalized PAA side chain is configured to provide chelating sites or coordination complexes with one or more transition metals to prevent dissolution into the electrolyte. In some embodiments, transition metal comprises manganese. A functionalized polymer refers to a macromolecule, here, PNB, that has a functional polymer group chemically attached to it. Consistent with disclosed embodiments, the functional group may include, but is not limited to, PAA. The PAA functional group permits the PNB to perform certain functions, here, preventing manganese dissolution in the electrolyte of the battery cell.

In some embodiments, the PAA side chain is configured to create one or more coordination complexes with one or more transition metals, here, manganese. As used herein, coordination complex refers to a product of a chemical reaction, wherein neutral molecules or anions (here, the PAA side chain) bond to a central metal ion (here, manganese). Similar to the chelating sites, the coordination complexes prevent unwanted manganese dissolution into the battery cell electrolyte, which helps increase battery life, prevent capacity loss over hundreds or thousands of battery cycles, and prevent battery failure.

By way of example, FIG. 3 is a diagram representing PNB-PAA polymer binder 300, consistent with disclosed embodiments. PNB-PAA polymer binder 300 contains PNB 302 as the binder's backbone. PNB-PAA binder 300 contains PAA side chain 304. Consistent with disclosed embodiments, PAA side chain 304 creates chelation sites and/or coordination complexes, i.e., chemical bonds, with manganese ions, with prevents unwanted manganese dissolutions within the electrolyte.

Figure 4:
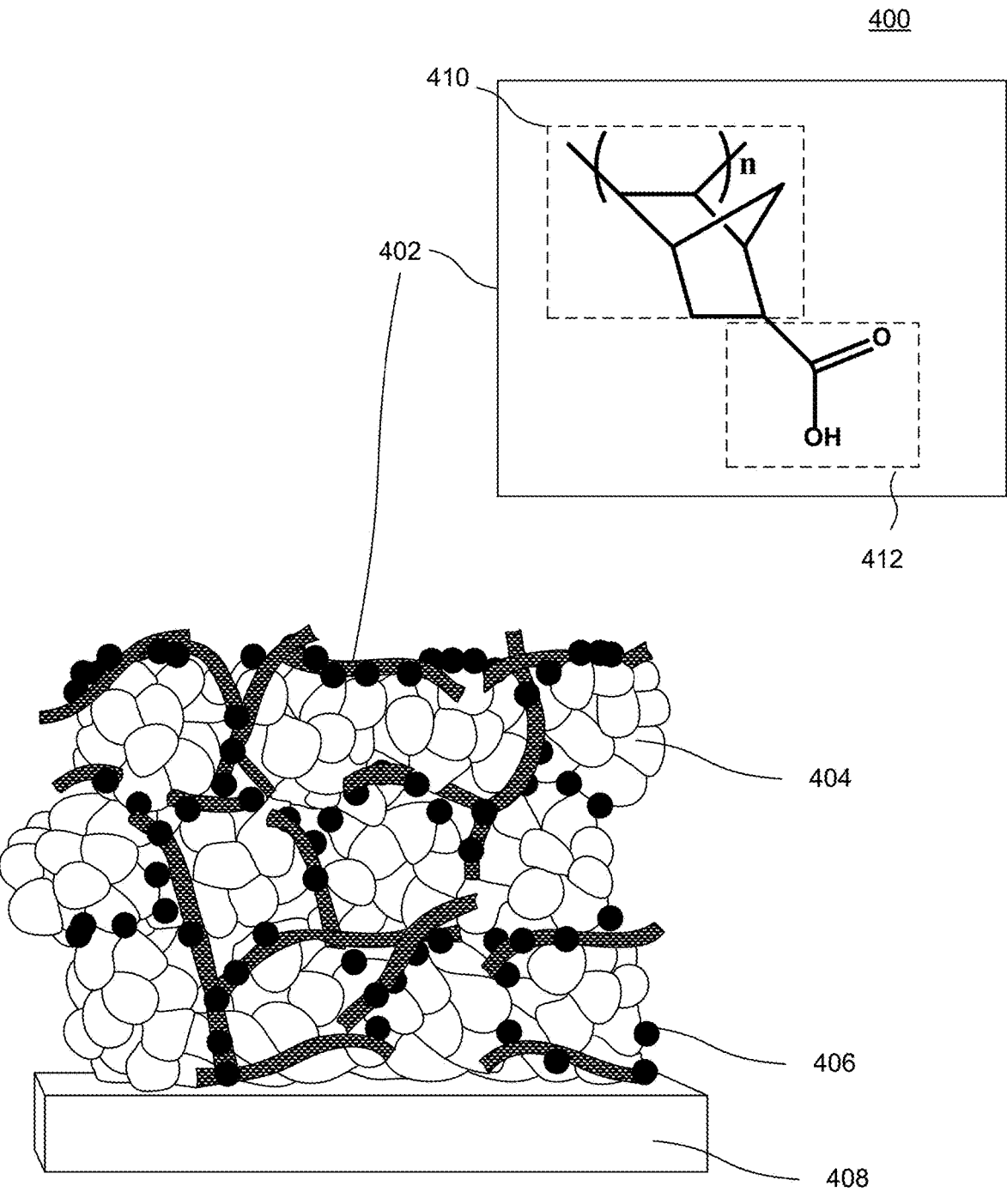
FIG. 4 is a schematic diagram illustrating a cathode electrode assembly with a PNB binder, consistent with embodiments of the present disclosure.

FIG. 4 is a diagram representing cathode electrode assembly 400 with PNB-PAA binder 402, consistent with disclosed embodiments. PNB-PAA binder 402 is configured to bind active material 404 (here, LMFP) and conductive additive substance 406 (here, carbon black) and maintain electrical contact between active material 404 and conductive additive substance 406 with current collector 408, here, aluminum. Consistent with disclosed embodiments, PNB-PAA binder 402 comprises PNB polymer backbone 410 and PAA side chain 412. In some embodiments, binder 402 comprises PNB.

In some embodiments, altering polymerization degree tunes one or more amphiphilic properties present in the PNB-PAA binder. Polymerization degree refers to the number of repeating monomer units present in a polymer molecule. Tune refers to making a small adjustment, calibration, modulation, and/or adaptation. Here, adding or subtracting functional PAA side chains to the PNB backbone may tune the PNB-PAA binder's amphiphilic properties, such that adding PAA side chains may increase the number of chelating sites for transition metal ions during battery cycling, which decreases transition metal-specifically manganese-dissolution into the electrolyte.

Adding or subtracting PAA side chains (also referred to as a functional group) may be measured by a Degree of Substitution ("DS"). In one example, a DS of 1 indicates that each available chelation site on the backbone polymer chain is substituted or functionalized with a PAA side chain. In another example, a DS of 0.5 indicates that only half of the available chelation sites are substituted or functionalized with a PAA side chain. A higher DS indicates that more available chelation sites are occupied by a PAA side chain. In a preferred embodiment, the DS is between 0.7 and 1.0.

In some embodiments, the LMFP active material comprises a plurality of crystallites. Crystallite refers to a small, solid-state structure with a crystallographic orientation and structure that may vary in size from nanometers to millimeters. Reducing LMFP active material crystallite size may help shorten the diffusion distance of lithium ions, which leads to faster charge and discharge rates during battery cycling. In some embodiments, each LMFP crystallite may be less than or equal to 100 nm in length. In a non-limiting example, LMFP crystallite may be 10 nm, 25 nm, 50 nm, and/or 75 nm in length. LMFP crystallites may be any length between 1 nm and 100 nm.

In some embodiments, the LMFP active material is doped with one or more materials selected from the group comprising: V5+; Mg2+; Ti4+; Zr4+; Nb5+; W6+; Cr6+; and Mo6+. Doping refers to the intentional introduction of impurities into a cathode for the purpose of modulating its electrical properties. Doping may enhance a cathode's structural stability, increase capacity retention, and/or improve resistance to thermal runaway.

Figure 5:
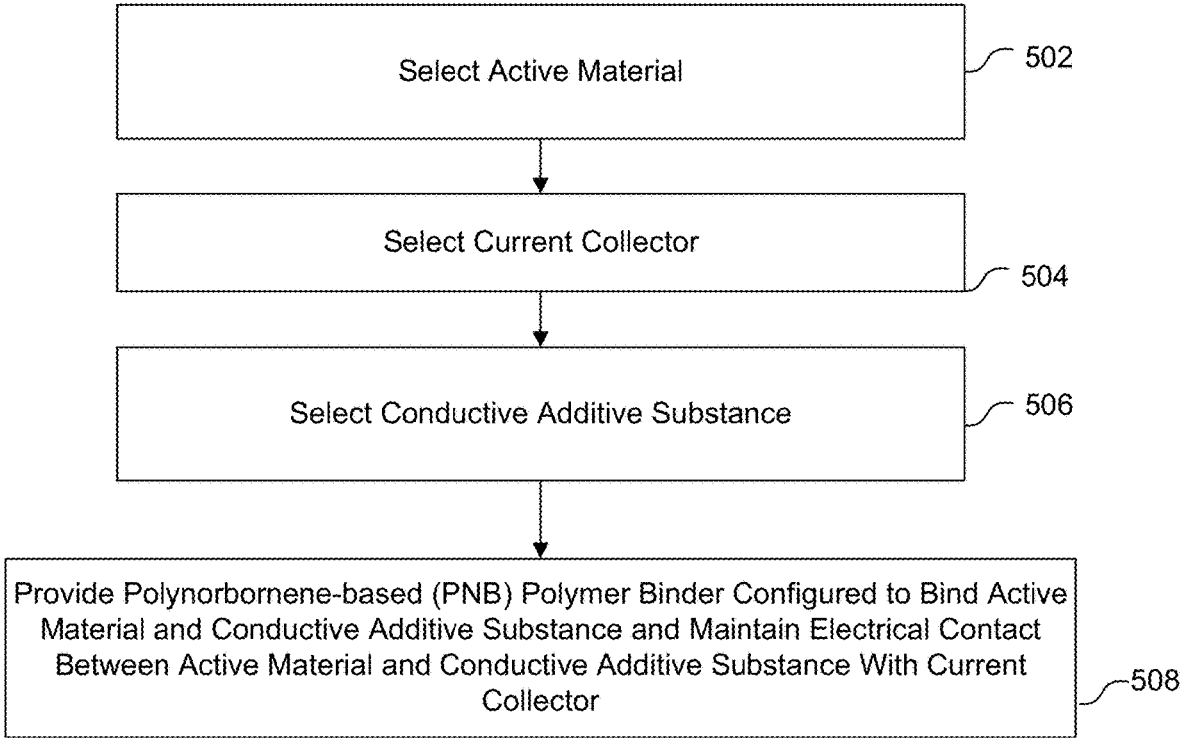
FIG. 5 is a flow chart illustrating a method for forming a cathode electrode assembly with a PNB binder, consistent with embodiments of the present disclosure.

FIG. 5 is a flowchart illustrating method 500 for forming cathode electrode assembly with PNB polymer binder, consistent with embodiments of the present disclosure. Method 500 includes step 502 of selecting active material. Consistent with disclosed embodiments, active material comprises LMFP.

Method 500 includes step 504 of selecting current collector. In this example, current collector is aluminum. In some embodiments, current collector may be another metal foil such as, but not limited to, copper, nickel, titanium, or any other suitable metal foil.

Method 500 includes step 506 of selecting conductive additive substance. Consistent with disclosed embodiments, conductive additive substance may include carbon nanotubes (CNT), graphene, and/or carbon nanofibers.

Method 500 includes step 508 of providing polynorbornene-based (PNB) polymer binder, consistent with disclosed embodiments. PNB polymer binder is configured to bind the active material and the conductive additive substance and maintain electrical contact between the active material and the conductive additive substance with the current collector.

FIG. 6 is a flow chart illustrating method 600 for forming PNB-PAA binder in cathode electrode assembly, consistent with embodiments of the present disclosure. Method 600 includes step 602 of providing PNB polymer backbone, consistent with disclosed embodiments. PNB polymer backbone is configured to bind active material and conductive additive substance and maintain electrical contact between the active material and the conductive additive substance with the current collector. Method 600 includes step 604 of providing at least one PAA side chain configured to interface with the PNB polymer backbone.

As described elsewhere in this disclosure, PNB provides reduced capacity loss and improved battery performance when compared to other commercially available binders in the prior art, such as PVDF and/or CMC-SBR.

Example 1

Figure 7A:
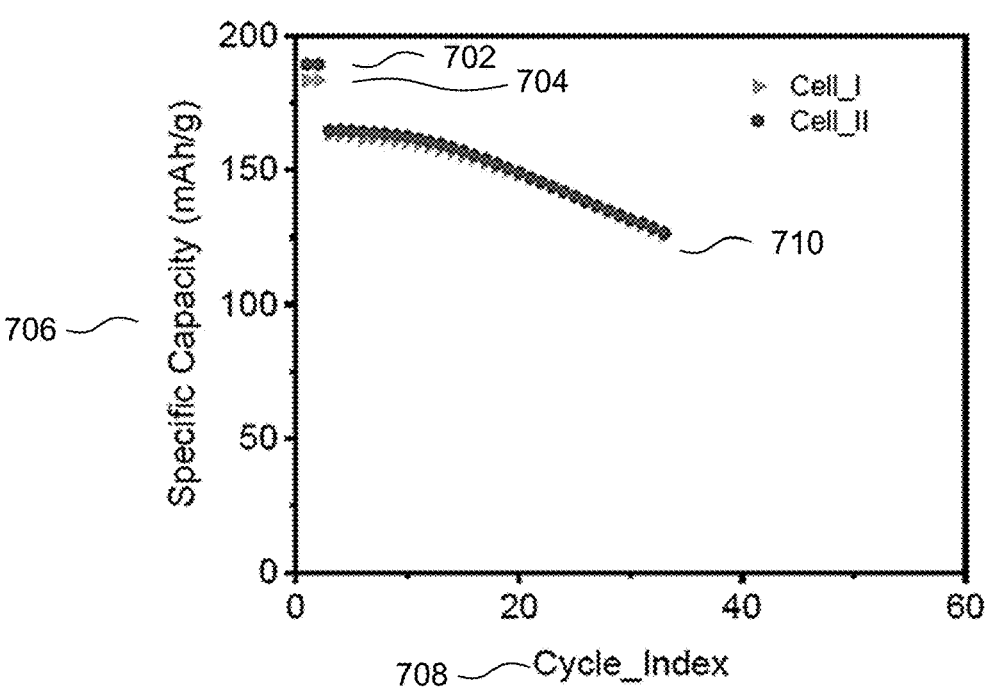
FIG. 7A is a graph illustrating LMFP cycling data achieved using non-functionalized PNB as a binder, consistent with embodiments of the present disclosure.

FIG. 7A is a graph illustrating LMFP cycling data achieved using non-functionalized PNB as a binder, referred to herein as PNB cycling data 700, consistent with embodiments of the present disclosure. PNB cycling data 700 was obtained using two LMFP cathode battery cells 702, 704. PNB cycling data 700 plots the observed specific capacity on y-axis 706 over multiple cycles, shown on x-axis 708. As described elsewhere in this disclosure, specific capacity 306 is measured in milliamp-hours per gram (mAh/g). The data obtained from LMFP cells 702, 704 is illustrated in PNB cycling curve 710, and the data obtained from LMFP cells 702, 704 shows similar capacity loss over time. PNB cycling curve 710 illustrates that specific capacity 706 of LMFP cells 702, 704 gradually decreased from approximately 165 mA/g to 125 mA/g over 35 cycles. As compared to PVDF cycling data 202, 204, PNB cycling data 710 represents a significant improvement to battery life, as PVDF cycling data 202, 204 illustrated a complete loss in specific capacity after 40 cycles.

Example 2

Figure 7B:
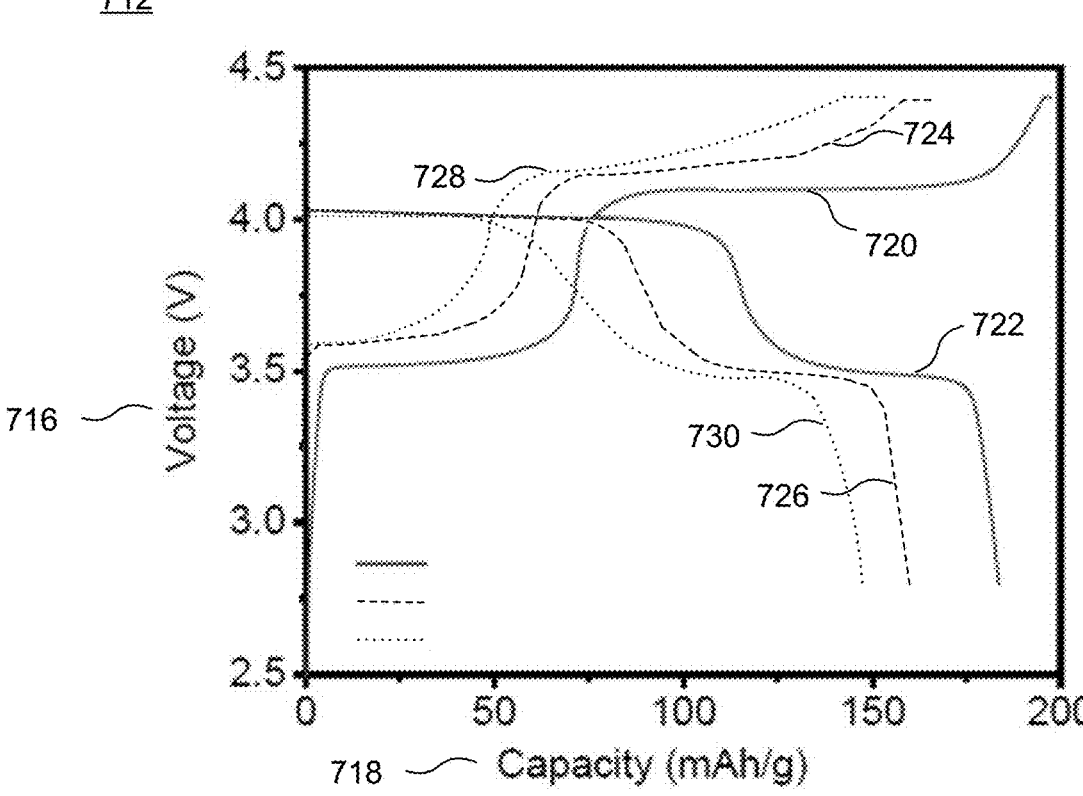
FIG. 7B is a graph illustrating galvanostatic charge and discharge capacity curves in an LMFP cathode battery cell using non-functionalized PNB as a binder, consistent with embodiments of the present disclosure.

FIG. 7B is a graph illustrating galvanostatic charge and discharge curves observed in an LMFP battery cell using non-functionalized PNB as binder, referred to herein as PNB charge/discharge data 712, consistent with embodiments of the present disclosure. PNB charge/discharge data 712 illustrates various charge/discharge curve data obtained over various stages of the LMFP cell's life. For example, PNB charge/discharge data 712 illustrates charge/discharge curves obtained after 1, 10, and 20 charge/discharge cycles. PNB charge/discharge data 712 provides the measured voltage (in volts) on y-axis 716 and the measured capacity (in mAh/g) on x-axis 718.

In this example, charge curve 720 illustrates data obtained during an LMFP cell's first charge/discharge cycle. Here, charge curve 720 shows that the LMFP cell operated at up to 4.4 V and a charge capacity of approximately 200 mAh/g. Discharge curve 722 illustrates data obtained during the LMFP cell's first charge/discharge cycle. Here, discharge curve 722 shows that the LMFP cell operated at approximately 4 V and a discharge capacity of approximately 180 mAh/g.

Charge curve 724 illustrates data obtained during the LMFP cell's tenth charge/discharge cycle. Here, charge curve 724 shows that the LMFP cell operated at up to 4.4 V and a charge capacity of approximately 160 mAh/g. Discharge curve 726 illustrates data obtained during the LMFP cell's tenth charge/discharge cycle. Here, discharge curve 726 shows that the LMFP cell operated at approximately 4 V at a discharge capacity of approximately 160 mAh/g.

Charge curve 728 illustrates data obtained during the LMFP cell's 20th charge/discharge cycle. Here, charge curve 728 shows that the LMFP cell operated at up to 4.4 V and a charge capacity of approximately 150 mAh/g. Discharge curve 730 illustrates data obtained during the LMFP cell's 20th charge/discharge cycle. Here, discharge curve 730 shows that the LMFP cell operated at approximately 4 V at a discharge capacity of approximately 150 mAh/g.

Without being bound by theory, the present inventors expect that adding a functionalized PAA side chain to the PNB polymer binder, will produce reduced capacity loss, improved battery life, improved battery performance, and reduced and/or minimal manganese dissolution.

As used in this disclosure, use of the term "or" in a list of items indicates an inclusive list. The list of items may be prefaced by a phrase such as "at least one of" or "one or more of." For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification, the terms "comprise," "include," or "contain" may be used interchangeably and have the same meaning and are to be construed as inclusive and open-ended. The terms "comprise," "include," or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Considering the significant values of a number, for a value that has no decimal point, the rightmost nonzero digit is the least significant digit. If there is a decimal point in the value, the rightmost digit is the least significant digit, even if it is a zero. All digits between the least and most significant digits are counted as significant. Whether there is a decimal point or not, the rightmost digit (zero or nonzero) will be read as $\pm\frac{1}{2}$ to indicate the uncertainty of scientific measurement, e.g., 0.5 will be read as a value between 0.45 and 0.55 instead of a single value 0.5. Another example is 1.50 will be read as a value between 1.45 and 1.55 instead of a single value 1.50.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives, and variations in the details, materials, and arrangements of the parts which have been described and illustrated in order to explain the nature of described embodiments may be made by those skilled in the art without departing from the scope. Accordingly, the following claims embrace all such alternatives, modifications, and variations that fall within the terms of the claims.

What is claimed is:

1. A cathode electrode assembly of an electric battery system, the cathode electrode assembly consisting essentially of:

an active material, wherein the active material consists essentially of, by weight, at least 80% of the total cathode electrode assembly weight;

a current collector;

a conductive additive substance, wherein the conductive additive substance consists essentially of, by weight, between 1% and 10% of the total cathode electrode assembly weight; and a polynorbornene-based (PNB) polymer binder configured to bind the active material and the conductive additive substance and maintain electrical contact between the active material and the conductive additive substance with the current collector, wherein the PNB polymer binder consists essentially of, by weight, between 2% and 10% of the total cathode electrode assembly weight.

2. The cathode electrode assembly of claim 1, wherein the PNB polymer binder is amphiphilic.

3. The cathode electrode assembly of claim 1, wherein altering a polymerization degree tunes one or more amphiphilic properties associated with the PNB polymer binder.

4. The cathode electrode assembly of claim 1, wherein the active material is lithium manganese iron phosphate (LMFP).

5. The cathode electrode assembly of claim 4, wherein the LMFP active material comprises a plurality of crystallites.

6. The cathode electrode assembly of claim 5, wherein each crystallite is less than or equal to 100 nm in length.

7. The cathode electrode assembly of claim 1, wherein the active material is doped with one or more materials selected from the group comprising: $V5+$; $Mg2+$; $Ti4+$; $Zr4+$; $Nb5+$; $W6+$; $Cr6+$; and $Mo6+$.

8. The cathode electrode assembly of claim 1, wherein the conductive additive element comprises at least one material selected from a group comprising: carbon nano-tubes (CNT), graphene, and carbon nanofibers.

9. The cathode electrode assembly of claim 1, wherein the PNB polymer binder is configured to withstand temperatures of at least 80° C.

10. The cathode electrode assembly of claim 1, wherein the PNB polymer binder is configured to operate at voltages of at least 4.2 V.

11. The cathode electrode assembly of claim 1, wherein the current collector comprises aluminum.

12. A cathode electrode assembly of an electric battery system, the cathode electrode assembly consisting essentially of:

an active material, wherein the active material consists essentially of, by weight at least 80% of the total cathode electrode assembly weight;

a current collector;

a conductive additive substance, wherein the conductive additive substance consists essentially of, by weight, between 1% and 10% of the total cathode electrode assembly weight;

a PNB polymer binder configured to bind the active material and the conductive additive substance and maintain electrical contact between the active material and the conductive additive substance with the current collector, wherein the PNB polymer binder consists essentially of, by weight between 2% and 10% of the total cathode electrode assembly weight; and at least one polyacrylic acid (PAA) side chain configured to interface with the PNB polymer binder.

13. The cathode electrode assembly of claim 12, where a degree of substitution associated with the PNB polymer binder is between 0.5 and 1.0.

14. The cathode electrode assembly of claim 12, wherein the PAA side chain is configured to chelate or create one or more coordination complexes with one or more transition metals.

15. The cathode electrode assembly of claim 14, wherein the one or more transition metals comprises manganese.

\* \* \* \* \*